United States Statutory Invention Registration [19]

[11] Reg. Number: H16

Kaun [45] Published: Jan. 7, 1986

[54] FUEL CELL ELECTRODE AND METHOD OF PREPARATION

[75] Inventor: Thomas D. Kaun, New Lenox, Ill.

[73] Assignee: The United States of America as represented by the United States Department of Energy, Washington, D.C.

[21] Appl. No.: 585,698

[22] Filed: Mar. 2, 1984

[51] Int. Cl.[4] ..... H01M 4/86; H01M 4/90; H01M 4/96; B05D 5/12

[52] U.S. Cl. ..... 429/29; 427/115; 427/123; 427/126.3; 427/126.6; 429/27; 429/41; 429/44; 429/45; 429/218; 429/223; 427/236

[58] Field of Search ..... 429/41, 44, 45

[56] References Cited

U.S. PATENT DOCUMENTS

| | | | |
|---|---|---|---|
| 3,933,520 | 1/1976 | Gay et al. | 429/41 |
| 4,129,685 | 12/1978 | Damiano | 429/44 X |
| 4,206,270 | 6/1980 | Kunz et al. | 429/40 |
| 4,301,218 | 11/1981 | Benczur-urmossy | 429/44 X |
| 4,404,267 | 9/1983 | Iacovangelo et al. | 429/41 |
| 4,407,905 | 10/1983 | Takeuchi et al. | 429/44 X |
| 4,411,968 | 10/1983 | Reiser et al. | 429/41 |
| 4,448,857 | 5/1984 | Iacovangelo | 429/45 X |

*Primary Examiner*—Teddy S. Gron

*Attorney, Agent, or Firm*—Hugh W. Glenn; Robert J. Fisher; Judson R. Hightower

[57] ABSTRACT

A fuel cell having good resistance to compressive creep includes electrodes having a superstructure of porous electrically conductive foam with surface sections adjacent to opposing surfaces of an electrolyte matrix impregnated with electrode catalyst materials. The catalyst materials are affixed in sections contiguous to an inner major surface by sinter bonding, electrochemical bonding or restrictive interstitial spacing. The outer sections of the porous plaque thickness are reserved for gas distribution to the electrode catalyst. Oxidant and fuel gases can be separately manifolded into alternate sides of a fuel cell stack by sealing opposing edges of the porous plaques containing the anode material in one set of opposing side surfaces and sealing opposing edges of the porous plaque containing cathode material in alternate side surfaces of the stack.

20 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FUEL CELL ELECTRODE AND METHOD OF PREPARATION

CONTRACTUAL ORIGIN OF THE INVENTION

The United States Government has rights in this invention pursuant to Contract No. W-31-109-ENG-38 between the U.S. Department of Energy and Argonne National Laboratory as represented by the University of Chicago.

BACKGROUND OF THE INVENTION

This invention relates to fuel cells, particularly to fuel cell electrodes having good creep resistance during operation in fuel cell stacks. Electrode creep resulting in a decrease in stack height is of particular concern in high temperature fuel cell units employing molten carbonate electrolyte.

A basic fuel cell includes an anode for contact with the fuel gas and a cathode for contact and reaction with an oxidant gas. The electrodes are separated by an electrolyte such as a porous matrix containing molten carbonate salts. Each electrode typically includes a layer of catalyst material, for instance a porous plaque of sinter bonded or compacted metal or metal oxide particles. A perforated sheet separates the catalyst from the second section of the electrode which includes channels for directing reactant gas to the catalyst. The catalyst layers are porous to permit the reactant gas to diffuse into contact with the catalyst material. In the electrochemical reaction that occurs, ions travel from the cathode through the electrolyte into the anode where the fuel is oxidized. This ionic flow drives an electrical current in an eletrical circuit external to the fuel cell.

Cathode catalyst materials such as nickel oxide or zinc oxide have been suggested. Alternate materials such as the perovskites including various oxygenates of lanthanum, for instance $LaMnO_3$, $LaCoO_3$ and various other cathode catalyst materials listed in U.S. Pat. No. 4,206,270 are of potential value for use in molten carbonate fuel cells. Anode catalysts of nickel and various other materials such as Ni-Cr and Cu are suitable for catalyzing the reaction of hydrogen gas at the anode.

A typical electrode structure is illustrated in FIG. 1 of the drawing. The electrode 10 includes a porous layer of catalyst material 11 supported on a perforated sheet 13 next to a generally comb shaped member 15 that defines channels 17 for reactant gas flow into contact with the catalyst. Member 15 is an electrically conductive member and serves as a bipolar separator sheet between electrode 10 and an adjacent electrode of opposite polarity. Additional channels (not shown) are arranged perpendicular to channels 17 to provide a second reactant gas to the adjacent electrode of opposite polarity.

The catalytic layers in electrodes as described above have been found to suffer compressive creep of between 5 and 50% in thickness when exposed to pressures of 100 to 300 kPa, temperatures of 600°–700° C. for periods of 100 to 400 hours operation. Such conditions may occur in the operation of a molten carbonate fuel cell stack. Compressive creep of this magnitude presents major problems in reactant gas sealing and other structural arrangements in a fuel cell stack.

Therefore in view of the above, it is an object of the present invention to provide an electrode for a fuel cell with improved compressive creep resistance under operating conditions of a fuel cell stack.

It is a further object to provide an electrode structure for containing electrode catalyst material and for providing reactant gas access to the catalyst material.

It is a further object to provide a fuel cell electrode including a coherent layer of catalyst material with improved creep resistance.

It is also an object of the present invention to provide a fuel cell with improved compressive creep resistance.

It is also an object to provide a method of preparing an electrode component for a fuel cell wherein the electrode component exhibits improved compressive creep characteristics.

It is a further object to provide a method for preparing a fuel cell in which intercell separators are made composite with the electrode component.

SUMMARY OF THE INVENTION

In accordance with the present invention, an electrode for a fuel cell is provided including a porous plaque with interconnecting porosity for gas passage. A coherent layer of particulate electrochemical catalyst is impregnated into only one surface section of the porous plaque leaving a major fraction of the porous plaque thickness open for gas flow into contact with the catalyst material. An intercell separator sheet of impermeable, electrically conductive material is bonded to the surface of the porous sheet opposite to the coherent layer of catalyst material. This defines a channel for gas flow between the separator sheet and the catalyst layer.

In more particular aspects the porous plaque is of generally incompressible structure under the cell operating conditions exhibiting less than 1% thickness compression under 100–400 kPa pressure for 100–500 hours at about 650°–700° C.

In other more specific aspects the porous plaque is an electrically conductive metal foam of 60 to 99% porosity having a pore size distribution of 100 to 300 microns. The porous plaque can be of nickel chromium alloy formed by electrochemical deposition onto a polymeric substrate capable of being driven off at subsequent elevated temperatures.

In other aspects the coherent layer of catalyst material can be sinter bonded into one section of the plaque thickness contiguous with only one major surface of the plaque.

In other aspects, the coherent layer can be electrochemically bonded into one major surface section of the porous plaque.

In an alternate aspect of the invention particulate catalytic material is compacted within the plaque at a major surface section having a larger pore size than a second major surface section with open interstices for reactant gas distribution. In other specific aspects a gas impermeable sheet is metallurgically bonded to the surface of the porous plaque opposite to the catalyst layer and to two opposing edge surfaces leaving alternate edge surfaces open for reactant gas passage.

The present invention also comprehends a fuel cell having a first electrode with catalyst for electrolytic reaction of fuel gas along with means for admitting fuel gas into contact with the first catalyst. A second electrode with catalyst for electrolytic reaction of oxidant gas along with means for admitting oxidant gas into contact with the second catalyst. The cell also includes a porous matrix containing electrolyte capable of ionic conduction between the first and second electrodes. At least one of the electrodes has a porous plaque of electrically conductive material including its catalyst disposed only in one major surface section and further including interconnecting intersticies throughout for passage of reactant gas into contact with its catalyst. More particularly the first and second electrodes each include a generally incompressible porous plaque of electrically conductive material with the major surface sections containing catalysts disposed adjacent to major surfaces of the electrolyte matrix. The porous plaques include a first pair of generally opposing edge surfaces that are sealed against reactant gas passage and a second pair of generally opposing edge surfaces that are open to admit reactant gas. In one arrangement, the open edges are arranged generally perpendicular to the sealed edges.

A fuel cell stack is formed including a plurality of first electrodes, the matrices and the second electrodes assemblied with the sealed edges of the first electrodes in alignment with the open edges of the second electrodes and the open edges of the first electrodes in alignment with the sealed edges of the first electrodes. Supply and discharge manifolds of fuel and oxidant gases respectively thereby can be coupled across a fuel cell stack at alternate side surfaces.

More specifically, it is contemplated that the fuel cell stack includes generally incompressible porous plaques that exhibit less than 1% compressive creep in height over 100–500 hours duration at 100–400 kPa load and 650°–700° C. temperature.

The present invention also relates to a method of preparing an electrode component for a fuel cell. A generally incompressible porous plaque of electrically conductive material having interconnecting interstices is provided. A catalyst is impregnated into a surface section contiguous to only one major surface of the porous plaque leaving open an adjacent section of thickness contiguous to an opposite major surface to permit passage of reactant gas. However, the major surface opposite to the impregnated surface section and one set of opposing edges of the porous plaque are sealed to prevent leakage of reactant gas. In more specific aspects of this method, the electrochemical catalyst is blended with a polymeric binder to form a paste, subsequently is shaped into a sheet and pressed into a surface section of the porous plaque contiguous with only one major surface. In other aspects, particles of electrochemical catalysts are sinter bonded together and to the interstitial surfaces of the porous plaque to maintain a coherent porous layer within the porous plaque structure.

Figure 1:
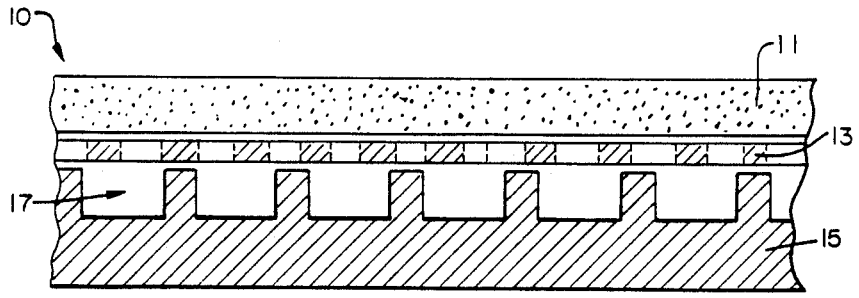
FIG. 1 (PRIOR ART)
FIG. 1 is a fragmentary schematic illustration of a prior art fuel cell electrode.
Figure 2:
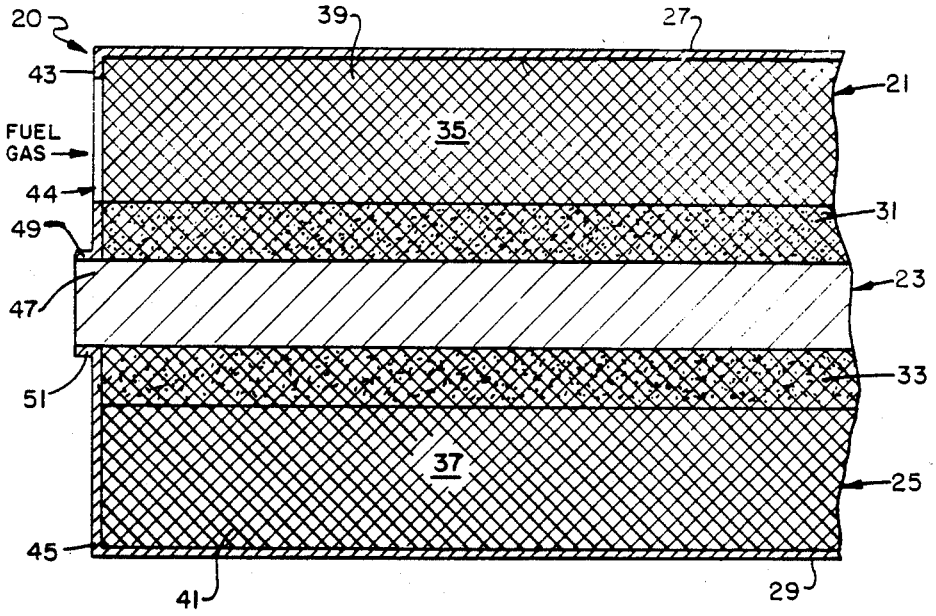

The present invention is illustrated in FIG. 2 which is a fragmentary schematic cross-section of a fuel cell.

DETAILED DESCRIPTION OF THE INVENTION

The invention is described in respect to FIG. 2 where a fuel cell 20 is illustrated. The fuel cell includes a first electrode such as an anode 21, a gas impermeable matrix 23 containing electrolyte and a second electrode such as a cathode 25. The three principle components of the fuel cell are arranged in a stack and separated from adjacent fuel cells by gas impermeable, electrically conductive plates 27 and 29 at opposing cell surfaces. Plates 27 and 29 advantageously may be metallurgically or otherwise bonded to the outward major surfaces of porous plaques 35 and 37 respectively to form an integral structure.

Electrodes 21 and 25 comprise porous plaque support structures 35 and 37 each with an impregnated layer of catalyst material 31 and 33 respectively in an inward, major surface section adjacent to electrolyte matrix 23. As shown in FIG. 2 the porous plaque support structures 35 and 37 extend through the thicknesses of the catalyst material 31 and 33 to the electrolyte matrix 23. The outward sections 39 and 41 of the porous plaques 35 and 37 remain substantially free of catalyst to admit and discharge reactant gases. Typically fuel gases such as hydrogen and/or carbon monoxide pass into the anode structure and oxidant gases such as $CO_2$ mixed with oxygen, air or hydrogen peroxide pass into the cathode structure.

As illustrated, edge surfaces of the electrodes are supported or covered by end plates 43 and 45. These plates advantageously may be bent or perpendicularly shaped marginal sections of separator plates 27 and 29. Plate 43 includes open portions 44 to expose the edge surface of anode 21 and admit fuel gas from a fuel gas manifold (not shown). An opposite edge surface of anode 21 likewise remains open to vent reaction products. In contrast, the corresponding edge surfaces of cathode 25 are sealed by plate 45 and a like plate at an opposite surface to prevent fuel gas leakage into the cathode.

At alternate side surfaces, e.g. those parallel to the plane section of the drawing, the edges of cathode 25 are exposed open to oxidant supply and discharge manifolds to provide oxidant gas passage into the open outward section 41 of cathode 25. Similarly at such perpendicular side surfaces, the edges of anode 21 are covered with gas impermeable sheets to prevent oxidant gas cross leakage and to provide component support.

Electrolyte matrix 23 can be provided with marginal portions 47 that extend outwardly beyond the electrode edges. These marginal portions 47 are shown in engagement with flanges 49 and 51 on the extremities of plates 43 and 45 respectively to provide a wet seal of for instance, molten carbonate salt between the electrodes and the matrix.

Porous plaques 35 and 37 are provided of a highly porous, electrically conductive material that is resistant to compressive forces. Metal foams, felts or other porous metal structures may be selected. The plaques also may be of an electronically conductive ceramic material or a ceramic coated with electrically conductive material.

In a preferred mode of the present invention, the porous plaques of the electrode structures are provided of a high porosity solid metal foam of sound structural integrity. Such foams are available commercially for instance, under the trademark Retimet and exhibit porosities of 60 to 99% void volume. Various pore sizes, of for instance 100–300 microns average, are available and suitable for use with the present invention. It is understood that such materials with high porosities and sound structural integrity, particularly in resistance to compressive creep, are prepared by electrochemical deposition on a polymeric substrate followed by burning out or otherwise volatilizing the substrate material. The burnout procedure provides open interstitial passages throughout the material that permit good distribution of reactant gases to the embedded catalyst.

The inventor has found that a porous plaque about 7 millimeters thick of nickel-chromium Retimet, when exposed to pressures of about 100 to about 400 kPa for a total time of 100–500 hours at temperatures of 650°–700° C., exhibited less than 1% in thickness deformation. Table I below gives additional data respecting the creep tests performed on this electrode structure material.

TABLE I

Creep Test Summary

| T(°C.) | Pressure (kPa) | Time (h) accumulative | Thickness Change (mm)* | Avg. % Thickness Change |
|---|---|---|---|---|
| 650 | 93 | 90 | −0.008 to −0.010 | 0.12 |
| 650 | 187 | 190 | −0.012 to −0.016 | 0.20 |
| 650 | 307 | 260 | −0.019 to −0.023 | 0.30 |
| 650 | 187 | 263 | −0.023 | 0.33 |
| 650 | 93 | 318 | −0.022 | 0.32 |
| 650 | 187 | 326 | −0.022 | 0.32 |
| 650 | 307 | 342 | −0.023 to −0.024 | 0.33 |
| 650 | 403 | 390 | −0.025 to −0.026 | 0.36 |
| 700 | 403 | 420 | −0.026 to −0.030 | 0.40 |
| 700 | 307 | 486 | −0.030 to −0.032 | 0.44 |
| 700 | 187 | 510 | −0.032 to −0.033 | 0.46 |
| 700 | 93 | 534 | −0.030 | 0.43 |

*Relative to the original 6.95 mm thickness

The tests were done in succession with the time under pressure being accummulated. The results show that when the pressure is relaxed the creeping essentially stops. Also the less than 1% compressive creep after over 500 hours elevated pressure is in considerable contrast to previous fuel cell electrode structures supported only as a sintered plaque of catalyst particles in which compressive creep of 5 to 30% has been exhibited under similar conditions. The results project acceptable creep resistance for up to 40,000 hours fuel cell stack life.

The catalyst material for the electrode may be embedded or impregnated into the porous structure or plaque by a number of techniques. For example, a slip of nickel oxide and a suitable polymeric binder material, e.g. an acrylic polymer binder such as one commercially available under the trademark Cerbind can be suitably milled and blended in preparation for casting a tape as a thin layer. The porous plaque of foam metal can then be pressed into the face of the tape to embed or impregnate the catalyst into the plaque. Sintering then may be accomplished either within a fuel cell or within a suitable furnace at temperatures of 600° to 800° C. to drive off the binder and sinter bond the particulate catalyst material into a coherent layer contiguous with only one surface of the resulting porous electrode structure. It will be clear that the binder material is of importance in retaining the particulate catalyst material only within the surface section until sintering can firmly bonded the material in place.

As an alternative mode, the porous plaque can be provided in two layers, the first of relatively large pore size for admitting the catalytic material and the second layer of more restricted pore size to substantially prevent entry by compacted catalyst.

Other methods of impregnating the porous plaque with the catalyst material can include extruding a layer of slip onto the porous plaque surface followed by pressing the layer into the interstitial surface volume. Also electrochemical deposition of the catalyst material into a surface section of the plaque can be used.

Although nickel and nickel oxide have been suggested as the anode and cathode catalyst material respectively, it will be clear that various other catalytic materials also may be employed. For example, the various perovskites including the lanthanum oxygenates disclosed in U.S. Pat. No. 4,206,270 to Kunz et al and various other alternate catalyst materials such as lithium oxygenates or the oxides of zinc may be useful catalysts.

In some instances it is desirable to employ fuel gases such as those obtained from the gasification of coal and other carbonaceous material that include methane or other hydrocarbons. Consequently, a fuel gas reforming catalyst such as nickel oxide can be deposited by chemical, electrochemical or other techniques within the porous structure of the anode plaque. The reforming catalyst can be included within the porous plaque section left open for gas flow or within the more compacted layer in mixture with the anode catalyst material.

Generally, the layer of electrode catalysts will comprise between 0.2 and 0.5 fraction of the superstructure thickness. As an example, an electrode of about 1.5 millimeters thickness will include approximately 0.3 to 0.7 millimeters of coherent layer of catalyst material.

It is therefore seen from the above that the present invention provides an electrode and a fuel cell that exhibit substantial improved resistance to compressive creep. The fuel cell stack composed of such improved fuel cells will eliminate or ameliorate many of the previous difficult problems relating to shearing of manifold gasket seals and damage to other mechanical connections and supports. This invention provides improved resistance to compressive creep by embedding the electrode catalyst within a superstructure of highly porous and structurally sound metal plaque.

Although the present invention is described in terms of specific embodiments, it will be clear that various changes in the structure and procedures can be made within the scope of the invention as limited only by the included claims.

The embodiments of this invention in which an exclusive property or privilege is claimed are defined as follows:

1. An electrode for a molten carbonate fuel cell comprising:

a generally incompressible porous plaque having interconnecting porosity for gas passage throughout the length and breadth thereof, and;

a coherent layer of particulate, electrochemically active catalyst material impregnated and sinter bonded into only one surface section of said plaque thickness leaving a major fraction of said plaque thickness open for gas flow into contact with said coherent layer, said porous plaque extending through the thickness of said coherent layer to restrain compressive creep.

2. The electrode of claim 1 wherein a sheet of electrically conductive, gas impermeable material is bonded to a major surface opposite to said impregnated surface section to define a channel for gas flow into contact with the catalyst material of said coherent layer.

3. The electrode of claim 1 wherein said porous plaque exhibits general incompressibility by compressing less than 1% in thickness under 90–400 kPa pressure, for 100–500 hours at temperatures of 650° C. to 700° C.

4. The electrode of claim 1 wherein said porous plaque comprises an electrically conductive metal foam of about 60–99% porosity with a pore size distribution of about 100 to 300 microns.

5. The electrode of claim 4 wherein said porous plaque is an electrochemically formed skeleton of nickel chromium alloy.

6. The electrode of claim 1 wherein said porous plaque includes interstitial passages throughout its length and breadth and wherein said coherent layer of catalyst material includes sinter bonded particles within the interstitial passageways of the porous plaque at said one surface section.

7. The electrode of claim 1 wherein said coherent layer includes electrochemically deposited material within the interconnecting porosity of said porous plaque.

8. The electrode of claim 1 wherein said coherent layer includes catalytic materials selected from the group consisting of Ni, NiO, lanthium containing oxygenates, lithium containing oxygenates, zirconates and ferrates.

9. The electrode of claim 1 wherein said porous plaque includes a first thickness of first pore size for receiving particulate catalytic material and a second thickness of smaller pore size for restricting entry of catalytic material while permitting reactant gas distribution to the catalytic material.

10. The electrode of claim 1 wherein a first pair of opposing edge surfaces are sealed against reactant gas passage and a second pair of opposing edge surfaces are open to permit reactant gas passage, said first opposing pair are aligned generally perpendicular to the second opposing pair.

11. A fuel cell including a first electrode having a first catalyst for electrolytic reaction of fuel gas and means for admitting fuel gas into contact with said first catalyst, a second electrode having a second catalyst for electrolytic reaction of oxidant gas and means for admitting oxidant gas into contact with said catalyst and a porous matrix containing a molten carbonate electrolyte capable of ionic conduction between said first and said second electrodes wherein at least one of said electrodes comprises a porous plaque of generally incompressible electrically conductive material having a coherent layer of one of said catalysts embedded into only one major surface section of the plaque thickness leaving a major fraction of said plaque thickness with open interconnecting intersticies throughout for passage of reactant gas into contact with said catalyst, said porous plaque extending through the thickness of said one catalyst layer to said molten carbonate electrolyte-containing matrix.

12. The fuel cell of claim 11 wherein said first and second electrodes each comprise a porous plaque of generally incompressible electrically conductive material, each with a major surface section containing embedded catalysts disposed at opposite surfaces of and facing said porous electrolyte matrix.

13. The fuel cell of claim 12 wherein said porous plaques of both said first and second electrodes having sealed edge surfaces at two generally opposing edges and two open edge surfaces at two generally opposing edges, the open edges are generally perpendicular to the sealed edges and wherein a plurality of said first electrodes, the porous matrices and the second electrodes are assembled into a stack of fuel cells with the sealed edges of said first electrodes in alignment with the open edges of said second electrodes and the open edges of said first electrode in alignment with the sealed edges of said first electrode for coupling to separate supply and discharge manifolds of fuel and oxidant gases and wherein each of said electrodes having a gas impermeable sheet bonded to the major surface of said porous plaque opposite to the surface section containing said catalyst.

14. The fuel cell stack of claim 13 including porous plaques that exhibit a compressibility of less than 1% in height after about 500 hours duration, 100–400 kPa load and 650°–700° C. temperature.

15. The fuel cell of claim 11 wherein the one catalyst is embedded particulate material in said one major surface section.

16. The fuel cell of claim 11 wherein said one catalyst is electrochemically deposited material in said one major surface section and wherein there is included electrochemically deposited reforming catalyst in said porous plaque.

17. A method of preparing an electrode component for a fuel cell comprising:

providing a generally incompressible porous plaque of electrically conductive material having interconnecting interstices throughout;

impregnating a section contiguous to only one major surface with a catalyst having electrochemical activity while leaving an adjacent section contiguous to the opposite major surface unfilled to permit passage of reactant gas through said porous plaque;

sealing opposing edges of said porous plaque to bar reactant gas entry or discharge while leaving alternate opposing edges open to admit and discharge reactant gases, and;

affixing a gas impermeable sheet to the major surface opposite to said impregnated surface section of said porous plaque.

18. The method of claim 17 wherein particles of solid electrochemical catalyst are blended with a polymeric binder into a paste, the paste is formed into a sheet and pressed into a section of said porous plaque contiguous with only one major surface thereof.

19. The method of claim 18 wherein said particles of electrochemical catalyst are sinter bonded together within intersticies of said porous plaque while driving off said polymeric binder.

20. The method of claim 17 wherein said catalyst is electrochemically deposited into said porous plaque and wherein a gas impermeable sheet is bonded to the major surface opposite to said impregnated surface section and additional gas impermeable sheet sections are bonded to the opposing edges of said porous plaque.

* * * * *